United States Patent
Hao et al.

(10) Patent No.: US 12,132,795 B2
(45) Date of Patent: Oct. 29, 2024

(54) DATA RECOMMENDATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Xiaobo Hao, Shenzhen (CN); Kaikai Ge, Shenzhen (CN); Yudan Liu, Shenzhen (CN); Linyao Tang, Shenzhen (CN); Xu Zhang, Shenzhen (CN); Ruobing Xie, Shenzhen (CN); Leyu Lin, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 130 days.

(21) Appl. No.: 17/948,082

(22) Filed: Sep. 19, 2022

(65) Prior Publication Data

US 2023/0017667 A1    Jan. 19, 2023

Related U.S. Application Data

(63) Continuation of application No. PCT/CN2021/101674, filed on Jun. 23, 2021.

(30) Foreign Application Priority Data

Aug. 28, 2020    (CN) .......................... 202010885140.7

(51) Int. Cl.
*G06F 16/9535*    (2019.01)
*H04L 67/50*    (2022.01)

(52) U.S. Cl.
CPC ........ *H04L 67/535* (2022.05); *G06F 16/9535* (2019.01)

(58) Field of Classification Search
CPC .......................... H04L 67/535; G06F 16/9535
See application file for complete search history.

(56) References Cited

U.S. PATENT DOCUMENTS

| | | |
|---|---|---|
| 11,132,700 B1 * | 9/2021 | Yin .................. G06F 17/18 |
| 2014/0351354 A1 * | 11/2014 | Chandra ............ H04L 65/403 |
| | | 709/204 |

(Continued)

FOREIGN PATENT DOCUMENTS

| CN | 102208086 A | 10/2011 |
| CN | 106897464 A | 6/2017 |

(Continued)

OTHER PUBLICATIONS

Tencent Technology, WO, PCT/CN2021/101674, Sep. 28, 2021, 5 pgs.

(Continued)

*Primary Examiner* — Dhairya A Patel
(74) *Attorney, Agent, or Firm* — Banner & Witcoff, Ltd.

(57) ABSTRACT

Embodiments of this application disclose a data recommendation method performed by a computer device. The data recommendation method includes: obtaining a service object set associated with a target user in a plurality of fields in response to a data recommendation request for the target user in a target field, performing cross-field cross-encoding on the plurality of fields and the service object set to obtain a target field interest feature of the target user in the target field; obtaining to-be-recommended service object features of a plurality of to-be-recommended service objects in the target field; and obtaining a target to-be-recommended service object feature matching with the target field interest feature of the target user from the to-be-recommended service object features, and returning a target to-be-recom- (Continued)

mended service object corresponding to the target to-be-recommended service object feature to the target user.

16 Claims, 10 Drawing Sheets

(56) References Cited

U.S. PATENT DOCUMENTS

| | | | | |
|---|---|---|---|---|
| 2016/0098493 | A1* | 4/2016 | Primke | G06F 16/9536 |
| | | | | 707/754 |
| 2017/0139912 | A1* | 5/2017 | Whitman | G06N 7/01 |
| 2017/0169349 | A1* | 6/2017 | Qi | G06Q 30/0631 |
| 2018/0081978 | A1* | 3/2018 | Lv | G06Q 30/0242 |
| 2019/0147050 | A1* | 5/2019 | Tian | G06F 16/335 |
| | | | | 707/722 |
| 2020/0142935 | A1 | 5/2020 | Venkatesan et al. | |
| 2020/0394533 | A1* | 12/2020 | Ramalingam | G06F 18/25 |
| 2021/0287274 | A1* | 9/2021 | Nguyen | G06N 3/04 |
| 2021/0326674 | A1* | 10/2021 | Liu | G06Q 30/0282 |
| 2023/0244727 | A1* | 8/2023 | Liu | G06N 20/20 |
| | | | | 707/706 |
| 2024/0281474 | A1* | 8/2024 | Craft | G06F 16/90335 |

FOREIGN PATENT DOCUMENTS

| | | |
|---|---|---|
| CN | 106951547 A | 7/2017 |
| CN | 109544306 A | 3/2019 |
| CN | 110032684 A | 7/2019 |
| CN | 110232153 A | 9/2019 |
| CN | 110472145 A | 11/2019 |
| CN | 111046280 A | 4/2020 |
| CN | 111159542 A | 5/2020 |
| CN | 111191121 A | 5/2020 |
| CN | 111291261 A | 6/2020 |
| CN | 111368210 A | 7/2020 |
| CN | 111368219 A | 7/2020 |
| CN | 111563205 A | 8/2020 |
| CN | 112035743 A | 12/2020 |
| EP | 3648041 A1 | 5/2020 |

OTHER PUBLICATIONS

Tencent Technology, IPRP, PCT/CN2021/101674, Feb. 28, 2023, 6 pgs.

Deqing Yang et al., "Semantic-Based Recommendation Across Heterogeneous Domains", IEEE International Conference on Data Mining, Jan. 7, 2016, 3 pgs., Retrieved from the Internet: https://ieeexplore.ieee.org/document/7373438.

Tencent Technology, ISR, PCT/CN2021/101674, Sep. 8, 2022, 2 pgs.

* cited by examiner

DATA RECOMMENDATION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/101674, entitled "DATA RECOMMENDATION METHOD AND APPARATUS, COMPUTER DEVICE, AND STORAGE MEDIUM" filed on Jun. 23, 2021, which claims priority to Chinese Patent Application No. 202010885140.7, filed with the State Intellectual Property Office of the People's Republic of China on Aug. 28, 2020, and entitled "DATA RECOMMENDATION METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a data recommendation method and apparatus, a computer device, and a storage medium.

BACKGROUND OF THE DISCLOSURE

In recent years, the increasing development and popularization of Internet technologies has brought a large amount of information to users and satisfied users' needs for information. However, with the exponential growth of information, it is difficult for users to dig the information they really want from the massive data. Accordingly, recommendation systems have been developed, which are used for accurate recommendation, that is, providing users with accurate recommended contents and services.

At present, recommendation systems select service contents to be recommended according to recent hot events, and then push the selected service contents to be recommended to all users.

SUMMARY

One aspect of the embodiments of this application provides a data recommendation method, including:
  obtaining a service object set associated with a target user in a plurality of fields in response to a data recommendation request for the target user in a target field, the service object set including service objects associated with the target user in each field, and the plurality of fields including the target field;
  encoding the plurality of fields and the service object set to obtain a target field interest feature of the target user in the target field;
  obtaining to-be-recommended service object features of a plurality of to-be-recommended service objects in the target field; and
  obtaining a target to-be-recommended service object feature matching with the target field interest feature of the target user from the to-be-recommended service object features, and returning a target to-be-recommended service object corresponding to the target to-be-recommended service object feature to the target user.

One aspect of the embodiments of this application provides a data recommendation apparatus, including:
  an obtaining module, configured to obtain a service object set associated with a target user in a plurality of fields in response to a data recommendation request for the target user in a target field, the service object set including service objects associated with the target user in each field, and the plurality of fields including the target field;
  an encoding module, configured to encode the plurality of fields and the service object set to obtain a target field interest feature of the target user in the target field;
  the obtaining module being further configured to obtain to-be-recommended service object features of a plurality of to-be-recommended service objects in the target field;
  a determination module, configured to obtain a target to-be-recommended service object feature matching with the target field interest feature of the target user from the to-be-recommended service object features; and; and
  an output module, configured to return a target to-be-recommended service object corresponding to the target to-be-recommended service object feature to the target user.

One aspect of the embodiments of this application provides a computer device, including a memory and a processor, the memory storing a computer program, the computer program, when executed by the processor, causing the computer device to execute the methods according to the above embodiments.

One aspect of the embodiments of this application provides a non-transitory computer-readable storage medium, storing a computer program, the computer program including program instructions, the program instructions, when executed by a processor of a computer device, causing the computer device to execute the methods according to the above embodiments.

One aspect of the embodiments of this application further provides a computer program product or a computer program, including computer instructions, the computer instructions being stored in a computer-readable storage medium, and the computer instructions, when executed by a processor of a computer device, executing the methods according to the above embodiments.

DESCRIPTION OF EMBODIMENTS

Figure 1:
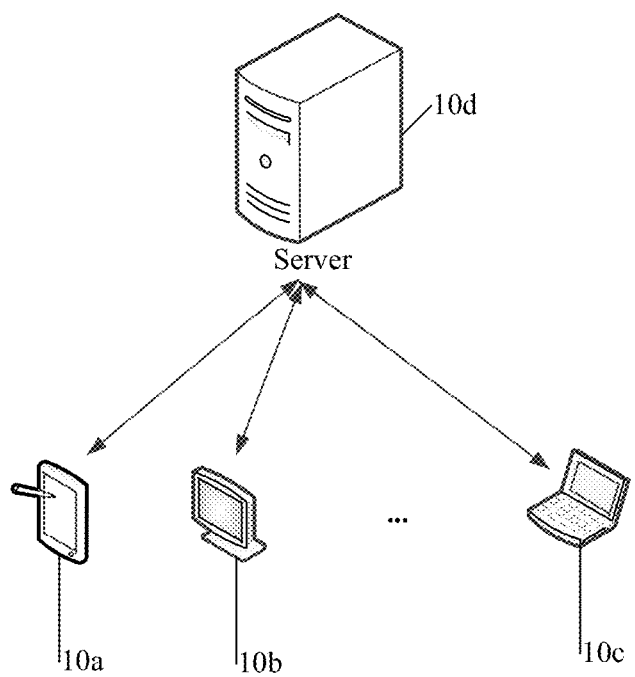
FIG. 1 is a diagram of a system architecture for data recommendation according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by persons of ordinary skill in the art based on the embodiments of this application without creative efforts shall fall within the protection scope of this application.

From the perspective of basic technology, the data recommendation method of this application relates to cloud computing in cloud technologies. From the perspective of application, the data recommendation method of this application relates to an artificial intelligence cloud service in cloud technologies.

In this application, cross-field cross-encoding on a plurality of fields and a service object set involves large-scale computing, which requires huge computing power and storage space. Therefore, in this application, a terminal device can obtain sufficient computing power and storage space through cloud computing technology, and further perform the operations of extracting a target field interest feature of a target user in a target field in the target field and extracting to-be-recommended service object features of a plurality of to-be-recommended service objects, which are involved in this application.

The data recommendation method involved in this application may be encapsulated as an artificial intelligence service, and only one interface is exposed externally. When the service object recommendation function involved in this application needs to be used in a certain service scenario, the interface may be invoked to implement a service object recommendation.

The solutions provided in the embodiments of this application belong to machine learning or deep learning in the field of artificial intelligence.

This application mainly involves determining an interest feature of a user in a specific target field by invoking a recommendation model and based on behavior data of the user in a plurality of fields, where the interest feature may be used for determining a to-be-recommended service object in the target field for the user.

This application may be applicable to the following scenarios: when it is necessary to recommend products in the target field to the target user, the behavior data of the target user in the plurality of fields is obtained, the interest feature of the target user in the target field is determined according to the behavior data in the plurality of fields, the interest feature is matched against product features of a plurality of to-be-recommended products in the target field, and the to-be-recommended product corresponding to the product features matching with the interest feature is outputted. Then, the matching to-be-recommended product may be pushed to the user to achieve accurate marketing and improve the accuracy of recommendation.

This application mines a user's personalized preferences according to the user's behavior, and then determines a to-be-recommended service object for the user. Different to-be-recommended service objects may be determined according to different user behaviors, so as to realize personalized content recommendation. In addition, compared with the determining of to-be-recommended service objects according to hot events, the determining of to-be-recommended service objects according to the user behavior can improve the accuracy of content recommendation, because the to-be-recommended content is determined based on the user's needs and is what the user really wants. Furthermore, because the interest feature of the user in the target field is determined based on user behaviors in different fields that complement each other, the recommendation of service objects in the target field for the user based on the interest feature in the target field is more targeted, which can further improve the accuracy of data recommendation.

FIG. 1 is a diagram of a system architecture for data recommendation according to an embodiment of this application. This application involves a server 10*d* and a terminal device cluster. The terminal device cluster may include: terminal device 10*a*, terminal device 10*b*, . . . , terminal device 10*c*, etc.

Taking the terminal device 10*a* as an example, when receiving a data recommendation request in a target field from a user, the terminal device 10*a* transmits the data recommendation request to the server 10*d*. The server 10*d* obtains a service object set associated with a target user in a plurality of fields. The server 10*d* performs cross-field cross-encoding on the plurality of fields and the service object set to obtain a target field interest feature of the target user in the target field, obtains to-be-recommended service object features of a plurality of to-be-recommended service objects in the target field, determines a target to-be-recommended service object feature matching with the target field interest feature of the target user from the to-be-recommended service object features, and outputs a target to-be-recommended service object corresponding to the target to-be-recommended service object feature. The server 10*d* may transmit the target to-be-recommended service object to the terminal device 10*a*, and the terminal device 10*a* displays the target to-be-recommended service object on a page, so as to accurately recommend the service object to the target user.

Alternatively, the determination of the target field interest feature of the target user and the determination of the target to-be-recommended service object may be performed by the terminal device 10*a*.

As shown in FIG. 1, the server 10*d* may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal device 10*a*, the terminal device 10*b*, the terminal device 10*c*, etc. shown in FIG. 1 may be smart devices such as mobile phones, tablet computers, notebook computers, palmtop computers, mobile internet devices (MIDs), and wearable devices. The terminal device cluster and the server 10*d* may be directly or indirectly connected through wired or wireless communication, which is not limited in this application.

How the server 10*d* determines a target to-be-recommended text for the target user is described in detail below by way of example.

Figure 2A:
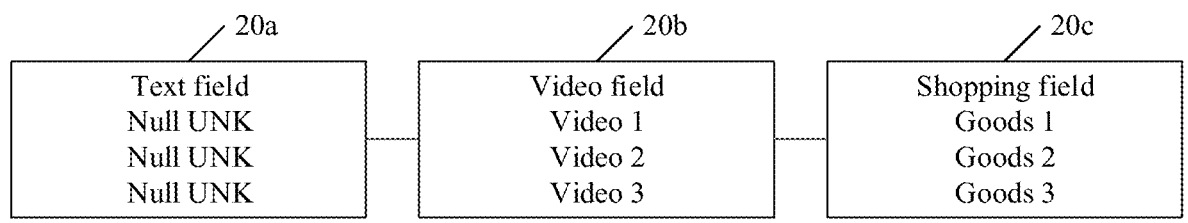
FIG. 2A to FIG. 2D are each a schematic diagram showing a data recommendation scenario according to an embodiment of this application.

FIG. 2A to FIG. 2D are each a schematic diagram showing a data recommendation scenario according to an embodiment of this application. As shown in FIG. 2A, when the server 10d receives a data recommendation request in a text field from a target user, the server 10d obtains service objects associated with the target user in a plurality of fields, the plurality of fields including a text field. It is assumed that the plurality of fields are the text field, a video field, and a shopping field, and the service objects associated with the target user are service objects that have been exposed to or clicked by the target user. The server 10d obtains a text set 20a associated with the target user in the text field. As shown in FIG. 2A, the text set 20a is empty, which means that the target user has not read any text. The server 10d obtains a video set 20b associated with the target user in the video field. The video set 20b includes video 1, video 2, and video 3, indicating that the target user has viewed or clicked video 1, video 2, and video 3. The server 10d obtains a goods set 20c associated with the target user in the shopping field. The goods set 20c includes goods 1, goods 2, and goods 3, indicating that the target user has viewed or clicked or purchased goods 1, goods 2, and goods 3.

Figure 2B:
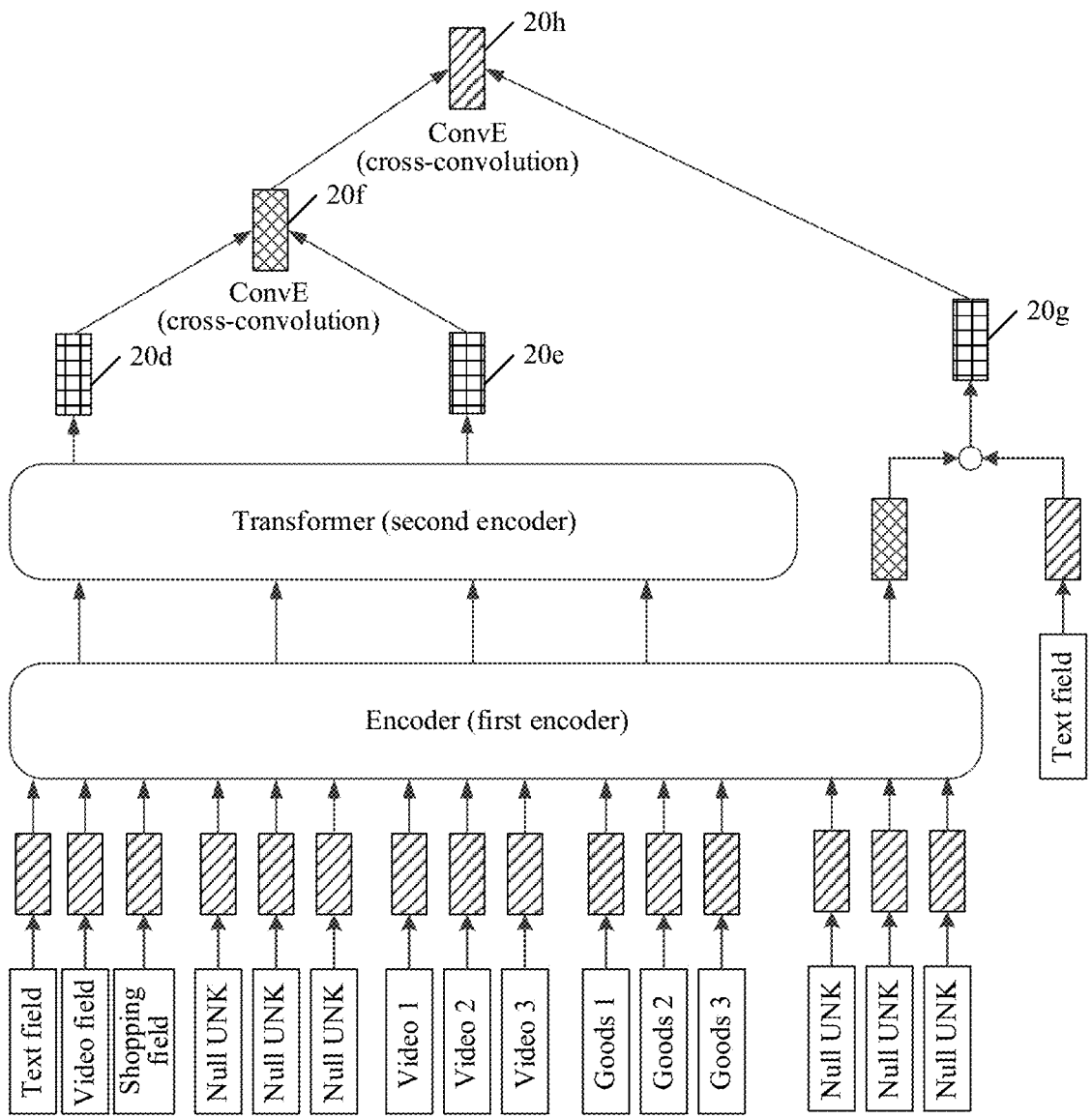

As shown in FIG. 2B, the server 10d obtains a text field feature corresponding to the text field, a video field feature corresponding to the video field, and a shopping field feature corresponding to the shopping field, and inputs these three field features into a first encoder. The first encoder encodes the three field features into a field feature vector, and then inputs the field feature vector into a second encoder Transformer. The second encoder encodes the field feature vector into a feature vector 20d.

The server 10d obtains a text feature corresponding to an empty text. The text feature corresponding to the empty text may be a vector of all 0s or a vector of all 1s. The three text features are inputted into the first encoder, and the first encoder encodes the three text features into a text feature vector.

The server 10d obtains a video feature corresponding to the video 1, a video feature corresponding to the video 2, and a video feature corresponding to the video 3. The three video features are inputted into the first encoder, and the first encoder encodes the three video features into a video feature vector.

The server 10d obtains a goods feature corresponding to the goods 1, a goods feature corresponding to the goods 2, and a goods feature corresponding to the goods 3. The three product features are inputted into the first encoder, and the first encoder encodes the three product features into a product feature vector.

The server 10d inputs the text feature vector, the video feature vector, and the goods feature vector into the second encoder Transformer, and the second encoder encodes the text feature vector, the video feature vector, and the goods feature vector into a feature vector 20e.

The server 10d then cross-convolves the feature vector 20d and the feature vector 20e into a feature vector 20f, where the feature vector 20f also represents a general interest feature of the target user.

Since the target field is the text field, it is also necessary to introduce knowledge information of the target field as a field bias, which is used to transform the interest space and learn a text field interest vector of the target user in the text field. A specific process is as follows: the server 10d then splices the text feature vector outputted by the first encoder and the text field feature corresponding to the text field into a feature vector 20g, and cross-convolves the feature vector 20f and the feature vector 20g into a feature vector 20h, where the feature vector 20h also represents a text field interest feature of the target user in the text field.

So far, the server 10d has determined the text field interest feature 20h of the target user in the text field. The text field interest feature 20h may be used for predicting preferences of the target user in the text field.

Figure 2C:
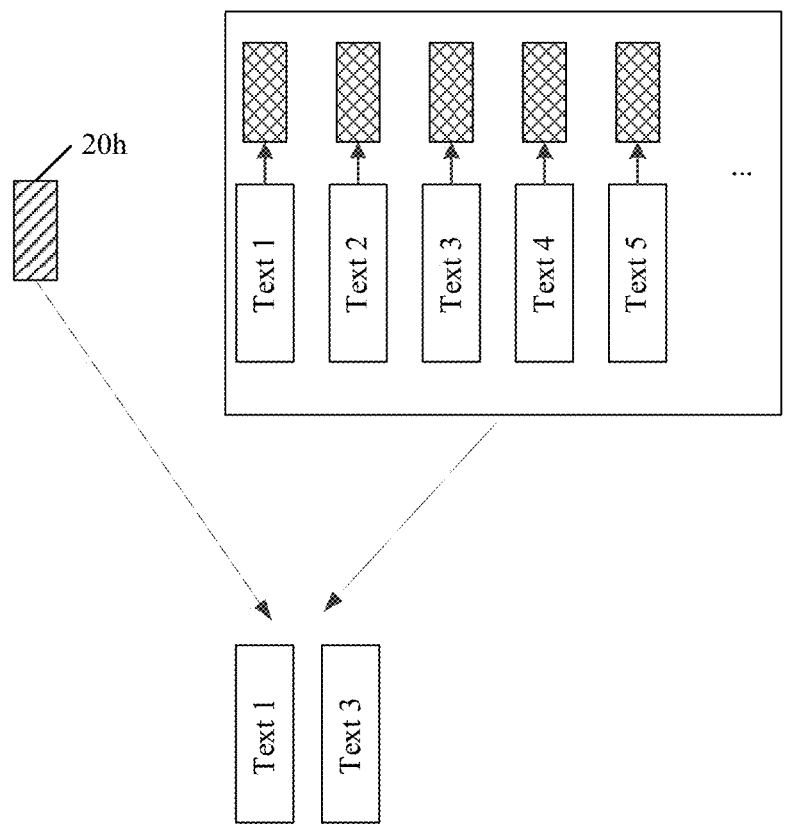
Figure 2D:
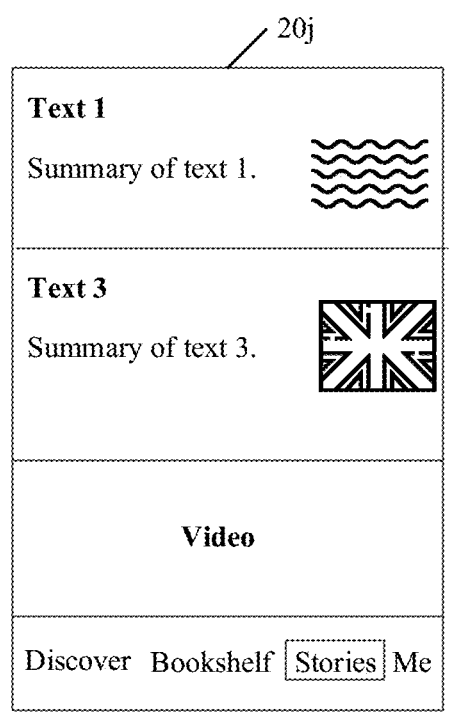

After the text field interest feature of the target user in the text field is determined, a prediction may be made. As shown in FIG. 2C, the server 10d obtains text features of five to-be-recommended texts, where the five text features are determined during training of the first encoder and the second encoder Transformer. The server 10a calculates a feature distance between the text field interest feature 20h and each of the text features, and uses the texts corresponding to the two text features with the smallest feature distance as the recommended text. It is assumed that among the five text features, the text feature of text 1 and the text feature of text 3 are text features closest to the text field interest feature 20h.

The server delivers the text 1 and the text 3 to the terminal device. The terminal device combines a summary of the text 1, a summary of the text 3, a cover image of the text 1, a cover image of the text 3, a title of the text 1, a title of the text 3, and a video cover (where the video cover is transmitted by another server according to another recommendation request) into a recommendation page 20j. The user may read part of the information of the text 1 and the text 3 on the recommendation page 20j, or the user may also click the text or video, and read detailed text content or watch video content.

For specific processes of obtaining the service object set (such as the text set 20a, the video set 20b, and the goods set 20c in the above embodiments) associated with the target user in the plurality of fields (such as the text field, the video field, and the shopping field in the above embodiments), obtaining the target field interest feature (such as the text field interest feature 20h in the above embodiments) and a plurality of to-be-recommended service object features (such as the text features of the five texts in the above embodiments), and determining the target to-be-recommended service object (such as the text 1 and the text 3 in the above embodiments), reference may be made to the embodiments corresponding to FIG. 3 to FIG. 7 below.

Figure 3:
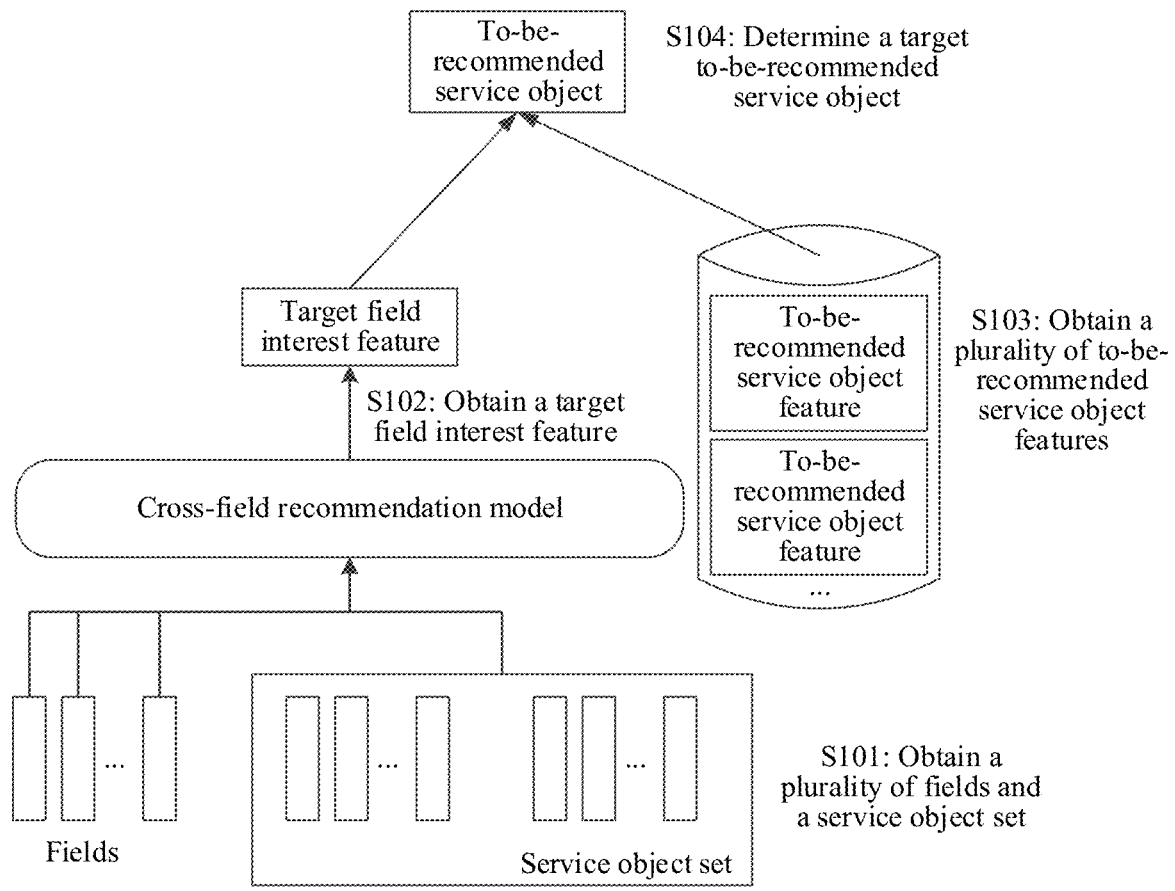
FIG. 3 is a schematic flowchart of data recommendation according to an embodiment of this application.

FIG. 3 is a schematic flowchart of data recommendation according to an embodiment of this application. The following embodiment uses a server as an execution entity to describe how to determine the target to-be-recommended service object of the target user. The data recommendation method may include the following steps:

Step S101: Obtain a service object set associated with a target user in a plurality of fields in response to a data recommendation request for the target user in a target field.

Specifically, in response to the data recommendation request for the target user in the target field, the server (such as the server 10d in the embodiments corresponding to FIG. 2A to FIG. 2D) obtains the service object set associated with the target user in the plurality of fields (such as the text set 20a, the video set 20b, and the goods set 20c in the embodiments corresponding to FIG. 2A to FIG. 2D).

Generally speaking, a data recommendation request is a request to recommend data in the target field to the target user. For example, if the target field is a text field, the data recommendation request is a request to recommend a text to the target user; if the target field is a shopping field, the data recommendation request is a request to recommend goods to the target user.

The target field is any of the plurality of fields. Service objects associated with the target user mean that the service objects have been exposed to the target user (or in other words, the target user has read these service objects) or the service objects are non-entity service objects (where the non-entity service object is null, which may be represented by special characters UNK). The quantity of service objects contained in the service object set associated with the target user in each field is the same and is equal to a quantity threshold, and the service object may be null (or in other words, the service object may be a non-entity service object).

The plurality of fields include at least two of: text field, video field, game field, embedded application field (i.e., applet field), shopping field, etc. The text field may further be divided into: short text field (for example, news, official account articles, etc.) and long text field (for example, novels). The video field may further be divided into: short video field (for example, short video within 1 minute) and long video field (for example, movies, television dramas, etc.).

For example, the target user has read text 1 and text 2 and has viewed video 1. If the plurality of fields include the text field and the video field, and the quantity of service objects associated with the target user in each field is 3, then the target service object set may be "text 1, text 2, null (UNK); video 1, null (UNK), null (UNK)." In this case, the service object "text 1", the service object "text 2", and the service object "video 1" are entity service objects, and the service object "null (UNK)" is a non-entity service object.

It can be learned that if the service objects associated with the target user in the target field are all null (that is, are all non-entity service objects), then the recommendation request may be considered as a cold start recommendation, that is, the target user does not have any behavior data in the target field, and a service object in the target field needs to be recommended to the target user based on behavior data of the target user in other fields.

The service object set is a to-be-recommended service object set. The to-be-recommended service object set includes a plurality of service objects in a plurality of fields. The to-be-recommended service object set is determined during training of a cross-field recommendation model.

For example, the to-be-recommended service object set includes text 1, text 2, and text 3 in the text field, and video 1, video 2, and video 3 in the video field. If the target user has read text 1, text 4, and video 4, then the service objects associated with the target user include text 1, null, and null in the text field, and null, null, and null in the video field.

A specific process of obtaining the service object set associated with the target user in the plurality of fields is as follows: At least one service object that has been exposed to the target user (or referred to as exposed service object, where the exposed service object also belongs to the to-be-recommended service object set) in each of the fields is obtained. When a quantity of the at least one exposed service object in any of the fields is equal to a quantity threshold (where the quantity threshold is an input quantity threshold of the cross-field recommendation model), the at least one exposed service object is combined into a unit service object set of the any field. The service object set includes a plurality of unit service object sets, and each of the unit service object sets corresponds to one field. When the quantity of the at least one exposed service object in the any field is less than the quantity threshold, the at least one exposed service object and at least one non-entity service object are combined into a unit service object set of the any field. The quantity of service objects contained in the unit service object set of each field is equal to the quantity threshold, and the unit service object set of each of the fields is combined into the service object set associated with the target user.

The exposed service objects obtained may be determined by a knowledge graph triplet of the target user. The knowledge graph triplet of the target user includes a user identity of the target user, a field identifier of the field related to the target user (where the field related to the target user belongs to the plurality of fields, and the field related to the target user is the field of the service object that has been exposed to the target user), and service objects that have been exposed to the target user in the field related to the target user. Therefore, the knowledge graph triplet may be represented as (user, field, service object).

Step S102: Encode the plurality of fields and the service object set to obtain a target field interest feature of the target user in the target field.

Specifically, a trained cross-field recommendation model is invoked to perform cross-encoding on the plurality of fields and the service object set of the target user to obtain a general interest feature of the target user (e.g., the feature vector 20f in the embodiments corresponding to FIG. 2A to FIG. 2D). The general interest feature is a one-dimensional vector.

After the general interest feature is determined, knowledge information of the target field needs to be introduced as a field bias to convert the user interest space and learn the target field interest feature of the target user in the target field (e.g., the text field interest feature 20h in the embodiments corresponding to FIG. 2A to FIG. 2D). Then the service objects that the target user may like in the target field may be predicted based on the target field interest feature. A process of determining the target field interest feature is as follows:

The server obtains a service object associated with the target user in the target field (referred to as a target service object, such as the three empty texts included in the text set 20a in the embodiments corresponding to FIG. 2A to FIG. 2D) from the service object set.

The cross-field recommendation model is invoked to perform cross-encoding on the general interest feature, the target field, and the target service object to obtain the target field interest feature of the target user in the target field. where the target field interest feature is also a one-dimensional vector.

How the cross-field recommendation model cross-encodes the plurality of fields and the service object set into the general interest feature is described in detail below.

The cross-field recommendation model includes a field encoder, an object encoder, and a field-object cross-encoder. The field encoder is configured to encode the plurality of fields. The object encoder is configured to encode the service object set. The field-object cross-encoder is configured to encode a vector obtained from the encoding of the plurality of fields and a vector obtained from the encoding of the service object set into the general interest feature of the target user. The field encoder is Encoder+Transformer, where Encoder is an RNN structure based on an attention mechanism, and Transformer includes n encoders (not including any decoder). Encoder in the field encoder is called an intra-field field encoder, and Transformer in the field encoder is called an inter-field field transformer. The server obtains an original field feature of each field (where the original field feature of each field is determined during training of the cross-field recommendation model). Assume that the quantity of fields is k, and each original field feature is of n1 dimensions. In this case, the k original field features may be expressed as k×n1. The k original field features k×n1 are inputted as an original field feature sequence into the Encoder in the field encoder. After performing self-attention cyclic encoding on the k original field features k×n1, the Encoder in the field encoder outputs k first encoding vectors, where each of the first encoding vectors may be of n2 dimensions. The k first encoding vectors may be combined into a matrix k×n2 (where the matrix may also be referred to as a first encoding vector sequence), and average pooling is performed on the matrix to obtain a second encoding vector of k×1 dimensions. Then the second encoding vector k×1 is inputted into the Transformer in the field encoder. After performing multi-head attention encoding processing on the second encoding vector k×1, the Transformer in the field encoder outputs a field feature of k×1 dimensions, where n1 may be equal to 512, and n2 may be equal to 8. The dimensions of the data outputted from the Transformer are the same as those of the data inputted to the Transformer. Through multi-field cross-learning, dense field features can be expressed, so as to solve the problem of sparse field features.

Average pooling refers to using an average value of values in a row (or a column) as a feature representation of this row (or this column).

The average pooling may be expressed by the following formula (1):

$$d_i = \text{Average\_pooling}(X_i) \quad (1)$$

where, $X_i$ represents a feature input.

An encoding process of the Transformer of the field encoder may be expressed by the following formula (2):

$$\hat{d}_i = \text{Transformer}(d_i) \quad (2)$$

where, $\hat{d}_i$ represents the field feature.

The object encoder includes a plurality of intra-field object encoders (Encoders) and an inter-field object transformer (Transformer). The quantity of intra-field object encoders is the same as the quantity of fields. Each of the intra-field object encoders is configured to encode service objects in the same field (that is, the unit service object set). The inter-field object transformer is configured to encode a plurality of encoding vectors outputted from the plurality of intra-field object encoders. The service object set includes a plurality of unit service object sets, and each of the unit service object sets corresponds to one field. Each of the intra-field object encoders (Encoders) is an RNN structure based on the attention mechanism, and the inter-field object transformer (Transformer) includes n encoders (not including any decoder). For a unit service object set, the server obtains the original object feature of each service object in the unit service object set (where the original object feature of each service object is determined during training of the cross-field recommendation model; if the service object is null UNK, then the original object feature of the service object may be a vector of all 0s or all 1s or other preset values). Assume that the unit service object set includes p service objects, and each original object feature is of r1 dimensions. In this case, the p original object features may be expressed as p×r1. The p original object features p×r1 are inputted as an original object feature sequence into the intra-field object encoder (Encoder). After encoding the original object feature sequence p×r1, the Encoder outputs p third encoding vectors, where each of the third encoding vectors may be of r2 dimensions. The p third encoding vectors may be combined into a matrix p×r2, and average pooling is performed on the matrix to obtain a fourth encoding vector of p×1 dimensions. Each of the unit service object sets is encoded in the above manner to obtain a fourth encoding vector of the each unit service object set. Assuming that the quantity of unit service object sets is k, then k fourth encoding vectors of p×1 dimensions may be obtained. The k fourth encoding vectors k×p are inputted into the inter-field object transformer (Transformer). After encoding the k fourth encoding vectors k×p, the Transformer outputs a feature matrix of k×p dimensions. Then average pooling is performed on the feature matrix k×p to obtain an object feature of k×1 dimensions. r1 may be equal to 512, and r2 may be equal to 8. Through the cross-learning of service objects in the plurality of fields, dense object features can be expressed, so as to solve the problem of sparse object features. Average pooling refers to using an average value of values in a row (or a column) as a feature representation of this row (or this column).

In addition to average pooling, maximum pooling, minimum pooling, etc. may also be used in the above pooling process.

An encoding process of the Transformer of the object encoder may be expressed by the following formula (3):

$$\hat{f}_i = \text{Transformer}(f_i) \quad (3)$$

where, $\hat{f}_i$ represents the feature matrix before pooling.

So far, the field features of the plurality of fields and the object features of the service object set have been determined by the field encoder, and the field features and the object features are of the same dimensions. The field-object cross-encoder is invoked to cross-encode the field features and the object features into the general interest feature of the target user, where the general interest feature is also a vector.

A cross-encoding method of the field-object cross-encoder is shown in the following formula (4):

$$u_g = \text{CovE}(\bar{f}, \hat{d})$$

$$\text{CovE}(e_1, e_2) = \text{flatten}(\text{CNN}(f(e_1, e_2))W_c) \quad (4)$$

where, $\bar{f}$ represents the object feature after pooling, $\hat{d}$ represents the field feature, $u_g$ represents the general interest feature, $e_1$, $e_2$ represents two one-dimensional vectors inputted to the field-object cross-encoder; $W_c$ represents a weight matrix of the field-object cross-encoder, the function $f(\bullet)$ represents a folding operation on two vectors, i.e., folding the two one-dimensional vectors into a two-dimensional matrix, and the function flatten($\bullet$) represents a transformation of a multi-dimensional input into a one-dimensional vector.

The calculation method shown in formula (4) can effectively improve the utilization of parameters when the features are sparse. In addition, this calculation method is also very effective for cross processing between different features.

So far, the general interest feature of the target user is obtained by invoking the cross-field recommendation model.

How the cross-field recommendation model cross-encodes the general interest feature, the target field, and the target service object into the target field interest feature is described in detail below.

As can be seen from above, the object encoder includes a plurality of intra-field object encoders (Encoders) and an inter-field object transformer (Transformer). The quantity of intra-field object encoders is the same as the quantity of fields. Each of the intra-field object encoders (Encoders) is an RNN structure based on the attention mechanism, and the inter-field object transformer (Transformer) includes n encoders (not including any decoder). The server obtains an original field feature of the target field (where the original field feature of the target field is referred to as a target field feature in order to distinguish it from the above-mentioned original field feature), obtains an original object feature of the target service object, and uses the intra-field object encoder of the target field to encode the original object feature of the target service object into a target object feature, where the target object feature may correspond to the above-mentioned fourth encoding vector of p×1 dimensions, and p represents the quantity of target service objects.

The target field feature and the target object feature are spliced into a target field object feature by using the following formula (5):

$$v_t = \text{Concat}(d_t, f_t) W_d \quad (5)$$

where, $d_t$ represents the target field feature, $f_t$ represents the target object feature, $v_t$ represents the target field object feature, and $W_d$ represents a weight matrix of the intra-field object encoder in the object encoder of the target field.

The field-object cross-encoder is invoked to cross-encode the general interest feature and the target field object feature into the target field interest feature. A calculation formula for the target field interest feature may be expressed by the following formula (6):

$$u_t = \text{ConE}(u_g, v_t) \quad (6)$$

where, $u_g$ represents the general interest feature, $v_t$ represents the target field object feature, and $u_t$ represents the target field interest feature of the target user in the target field.

So far, the server has obtained the target field interest feature by invoking the cross-field recommendation model.

Figure 4A:
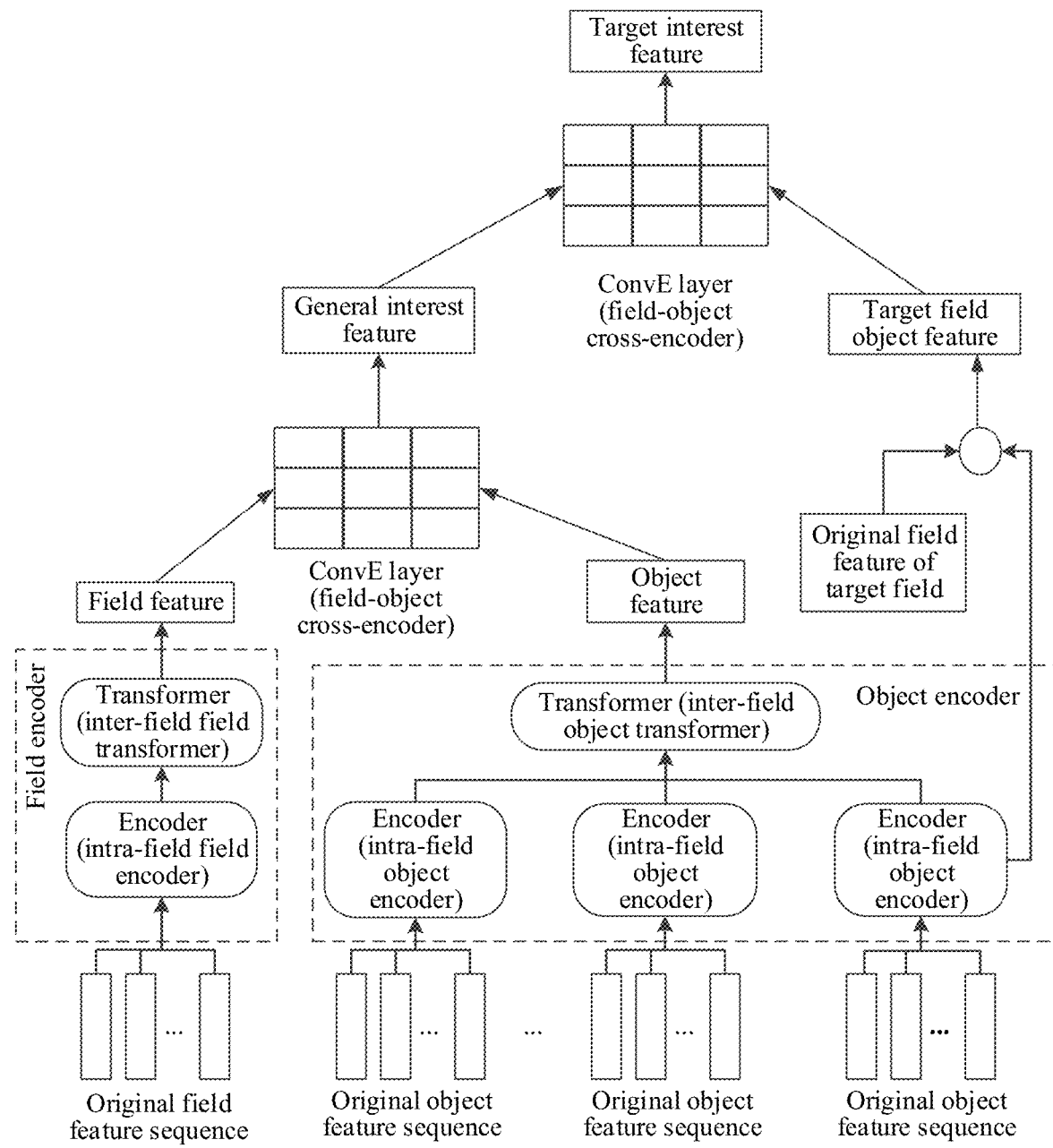
FIG. 4A is a schematic diagram of a cross-field recommendation model according to an embodiment of this application.

FIG. 4A is a schematic diagram of a cross-field recommendation model according to an embodiment of this application. An original field feature sequences of a plurality of fields is inputted into a field encoder (where the field encoder includes an intra-field field encoder and an inter-field field transformer) to obtain field features. An original object feature sequence corresponding to a unit service object set in each of the fields is inputted into an object encoder (where the object encoder includes a plurality of intra-field object encoders and an inter-field object transformer) to obtain object features. The field features and the object features are inputted into a field-object cross-encoder to obtain a general interest feature of a target user. An original field feature of a target field (referred to as a target field feature) is obtained, the original object feature sequence in the target field is encoded into a target object feature through the intra-field object encoder in the target field, and the target field feature and the target object feature are spliced into a target field object feature. The general interest feature and the target field object feature are inputted into the field-object cross-encoder to obtain a target interest feature of the target user in the target field.

In this application, the Transformer is used to extract intra-field features to solve the problem of sparse features, and ConvE is used to perform inter-field feature cross-computation to improve the effect of cross-field feature cross-computation, making the extracted cross-field features more distinguishable, and enhancing user behavior derivation capabilities. By introducing the knowledge information of the target field as a field bias to transform the user interest space, the expression ability of the target field interest feature of the user is enhanced, thereby improving the accuracy of subsequent service object recommendation.

Step S103: Obtain to-be-recommended service object features of a plurality of to-be-recommended service objects in the target field.

Specifically, the server obtains original object features of the plurality of to-be-recommended service objects in the target field (to distinguish from the original object features described above, the original object features of the to-be-recommended service objects are referred to as to-be-recommended service object features).

The to-be-recommended service objects in the target field have been determined during training of the cross-field recommendation model, and the to-be-recommended service object features of the to-be-recommended service objects have also been determined during training of the cross-field recommendation model. The to-be-recommended service objects are all entity service objects. The quantity of target service objects associated with the target user in the target field may be more than one, and a plurality of target service objects may all be null, that is, may all be non-entity service objects (referred to as non-entity target service objects); or the plurality of target service objects include an entity target service object and a non-entity target service object, and the entity target service object belongs to the plurality of to-be-recommended service objects in the target field.

Step S104: Obtain a target to-be-recommended service object feature matching with the target field interest feature of the target user from the to-be-recommended service object features, and output a target to-be-recommended service object corresponding to the target to-be-recommended service object feature.

Specifically, the server calculates a feature distance between the target field interest feature and the to-be-recommended service object feature of each of the to-be-recommended service objects in the target field. A Euclidean distance may be used to measure the feature distance between the target field interest feature and each of the to-be-recommended service object features. A larger feature distance indicates a smaller similarity between the target field interest feature and the to-be-recommended service object feature, and indicates a lower probability that the target user likes the to-be-recommended service object corresponding to the to-be-recommended service object feature. On the contrary, a smaller feature distance indicates a greater similarity between the target field interest feature and the to-be-recommended service object feature, and indicates a higher probability that the target user likes the to-be-recommended service object corresponding to the to-be-recommended service object feature.

The server sorts the plurality of feature distances, and uses the n to-be-recommended service object features corresponding to the smallest feature distance as the target to-be-recommended service object features. The to-be-recommended service objects corresponding to the target to-be-recommended service object features are used as the target to-be-recommended service objects (e.g., the text 1 and the text 3 in the embodiments corresponding to FIG. 2A to FIG. 2D), and the target to-be-recommended service objects are outputted. The target to-be-recommended service objects are the predicted service objects that the target user may like in the target field.

For example, there are currently three to-be-recommended service objects: to-be-recommended service object A, to-be-recommended service object B, and to-be-recommended service object C. A feature distance between the target field interest feature and the to-be-recommended service object feature of the to-be-recommended service object A is 0.3, a feature distance between the target field interest feature and the to-be-recommended service object feature of the to-be-recommended service object B is 0.5, and a feature distance between the target field interest feature and the to-be-recommended service object feature of the to-be-recommended service object C is 0.1. If a service requires the quantity of target to-be-recommended service objects to be 2, the to-be-recommended service objects corresponding to the smallest two feature distances may be used as the target to-be-recommended service objects, that is, the to-be-recommended service object A and the to-be-recommended service object C are both target to-be-recommended service objects.

In some embodiments, if the target field is the text field, the target to-be-recommended service object is a target to-be-recommended electronic reading material. The target to-be-recommended electronic reading material may be a novel, news, an article of an official account, etc.

In some embodiments, the server may deliver a target to-be-recommended service object to a terminal device of the target user, so as to expose the target to-be-recommended service object to the target user. After the target user reads the target to-be-recommended service object, if the target user is interested in the target to-be-recommended service object, the target user may click the target to-be-recommended service object to view detailed contents of the target to-be-recommended service object. If the target user is not interested in the target to-be-recommended service object, the target user may skip the target to-be-recommended service object. The server may combine the target user, the target field, and the exposed target to-be-recommended service object into a new knowledge graph triplet of the target user. The knowledge graph triplet may be represented as (user, field, service object). Based on the new knowledge graph triplet, the cross-field recommendation model may be updated. Whether the target user clicks a target to-be-recommended service object may be used as a label of the target to-be-recommended service object. For example, if the target user clicks the target to-be-recommended service object A, then the label of the target to-be-recommended service object A is 1. If the target user does not click the target to-be-recommended service object A, then the label of the target to-be-recommended service object A is 0.

As can be seen from the above, this application proposes the definition of knowledge graph triplet, which can be used for modeling of data structures in multiple product fields, thereby achieving a unified the data form, and providing a data basis for model training. In this application, the Transformer is used to extract intra-field features to solve the problem of sparse features, and ConvE is used to perform inter-field feature cross-computation to improve the effect of cross-field feature cross-computation, enhancing user behavior derivation capabilities. By introducing the knowledge information of the target field as a field bias to transform the user interest space, the expression ability of the target field interest feature of the user is enhanced. Finally, the solution of this application may be applicable to a user-started data recommendation scenario, to improve the recommendation accuracy of cold startup.

Figure 4B:
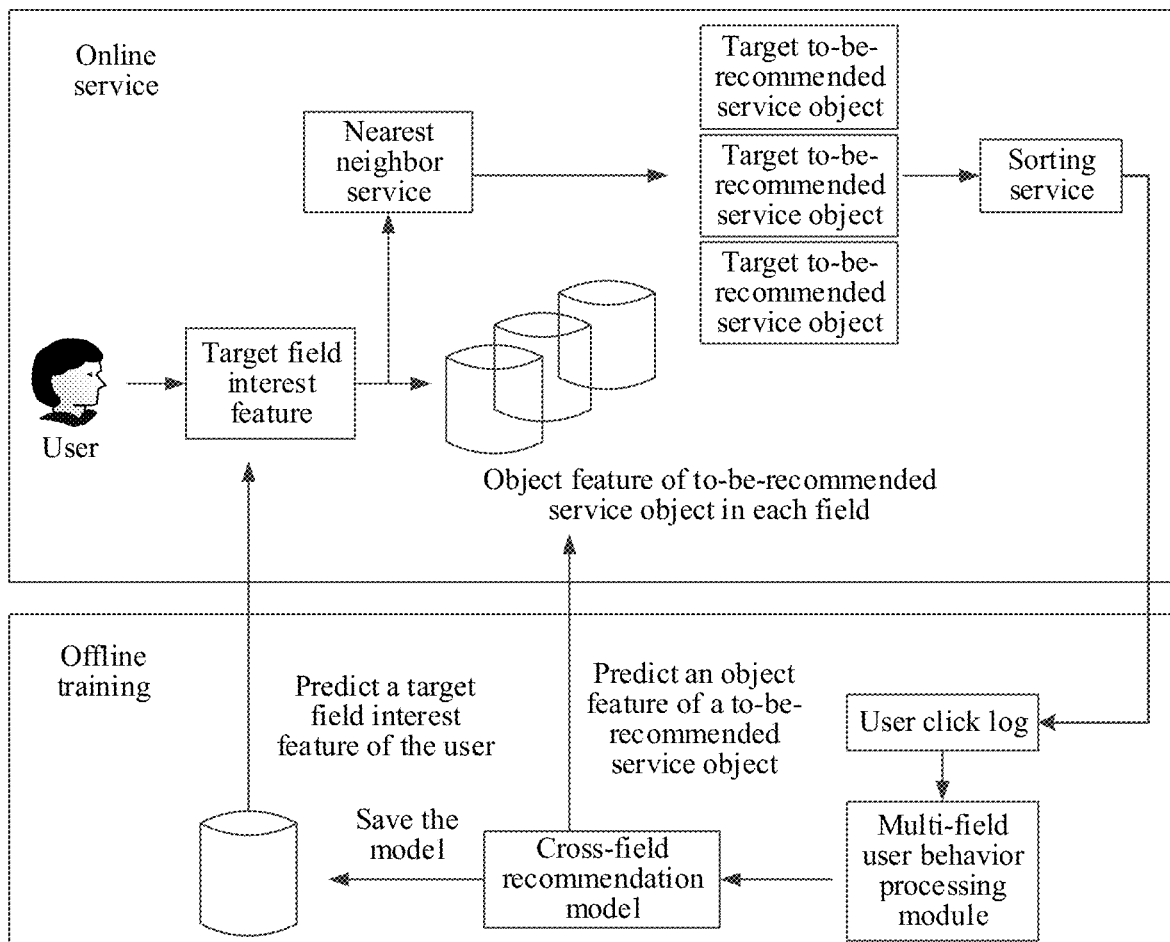
FIG. 4B is an overall architectural diagram of data recommendation according to an embodiment of this application.

FIG. 4B is an overall architectural diagram of data recommendation according to an embodiment of this application. As shown in FIG. 4B, data recommendation involves two modules: online service and offline training. Offline training is to train a cross-field recommendation model, and determine original object features of to-be-recommended service objects in a plurality of fields. A trained cross-field recommendation model can predict a target field interest feature of a user in a target field. A nearest neighbor service is invoked to determine a feature distance between the target field interest feature and an original object feature of each to-be-recommended service object in the target field (referred to as a to-be-recommended service object feature), and the to-be-recommended service objects corresponding to the to-be-recommended service object features corresponding to the smallest k feature distances are used as target to-be-recommended service objects. A sorting service is invoked to sort the k target to-be-recommended service objects, and deliver the sorted k target to-be-recommended service objects to a terminal device of the user, so as to provide an accurate recommendation to the user. Subsequently, a user click log of the user for the target to-be-recommended service object may be obtained. A multi-field user behavior processing module generates a knowledge graph triplet based on the user click log, and updates the cross-field recommendation model according to the knowledge graph triplet.

Figure 5A:
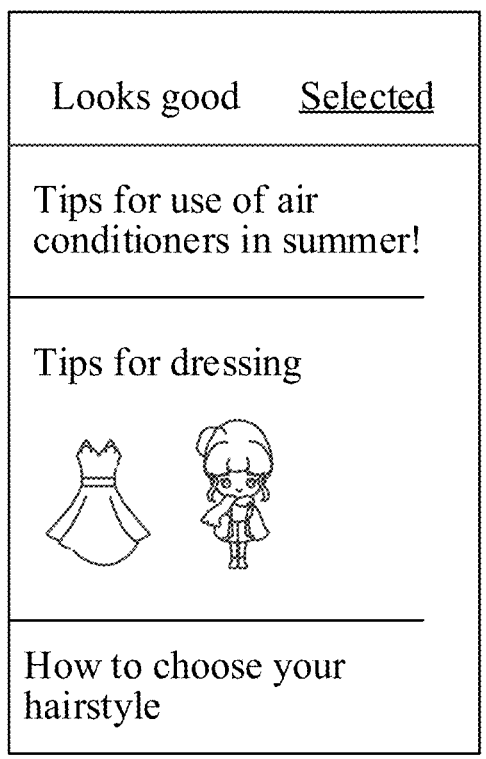
FIG. 5A to FIG. 5B are each a schematic diagram of a target to-be-recommended service object according to an embodiment of this application.
Figure 5B:

FIG. 5A to FIG. 5B are each a schematic diagram of a target to-be-recommended service object according to an embodiment of this application. As shown in FIG. 5A, when the target field is a text field, it indicates that the current data recommendation request is a request to recommend a text to the target user. After the server determines a text to be recommended in the above manner, the server delivers the text to the terminal device of the target user. The text delivered by the server is displayed in the terminal device of the target user. During displaying, a text cover of the text may be displayed first (where the text cover includes a text title, a text illustration, etc.), and detailed text contents are displayed after the user clicks the text cover.

As shown in FIG. 5B, when the target field is a text field and a video field, it indicates that the current data recommendation request is a request to recommend a text and a video to the target user. After the server determines a text and a video to be recommended in the above manner, the server delivers the determined text and video to the terminal device of the target user. The text and video delivered by the server are displayed in the terminal device of the target user. During displaying, a text cover of the text (where the text cover includes a text title, a text illustration, etc.) and a video cover of the video (where the video cover includes any video frame image in the video) may be displayed first, and detailed text contents are displayed or video contents are played after the user clicks the text cover or the video cover.

Figure 6:
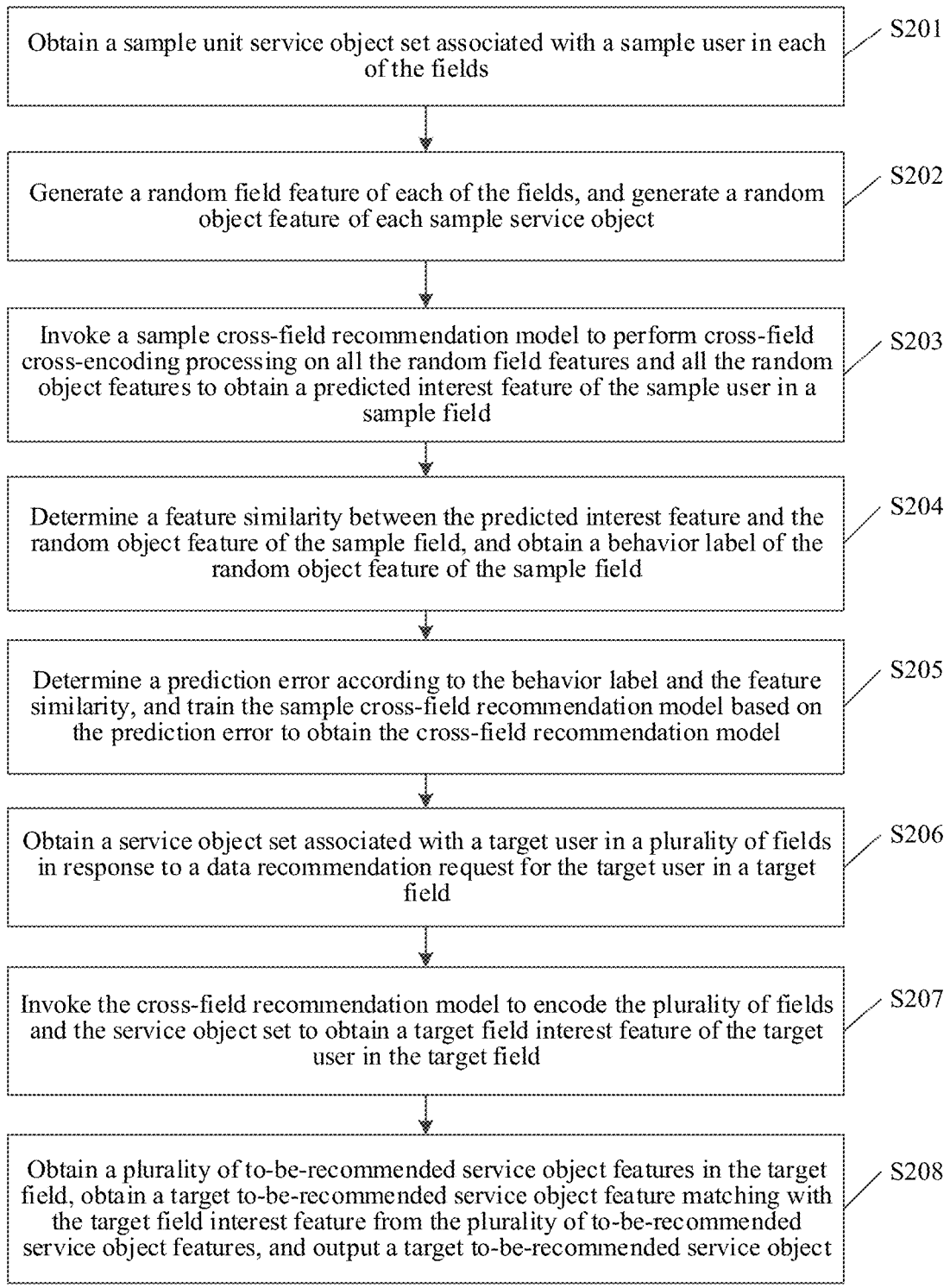
FIG. 6 is a schematic flowchart of a data recommendation method according to an embodiment of this application.

FIG. 6 is a schematic flowchart of a data recommendation method according to an embodiment of this application. The following embodiments mainly describe a process of training a cross-field recommendation model. The data recommendation method may include the following steps:

Step S201: Obtain a sample unit service object set associated with a sample user in each of the fields.

Specifically, because model training involves multiple iterations, this embodiment takes one iteration using one sample user as an example for description.

The server obtains a sample knowledge graph triplet set of the sample user. The sample knowledge graph triplet set includes a plurality of sample knowledge graph triplets. Any of the sample knowledge graph triplets includes a user identity of the sample user, a field identifier of any field in the plurality of fields, and an object identifier of the sample service object that has been exposed to the sample user in the any field. In other words, each of the sample knowledge graph triplets may be expressed as (user, field, service object). The sample unit service object set associated with the sample user in each of the fields is determined in the sample knowledge graph triplet set. The quantity of sample service objects contained in each sample unit service object set is equal to the quantity threshold described above. It can be learned that the sample service objects associated with the sample user specifically mean that the sample service objects have been exposed to the user, each unit service object set includes exposed sample service objects that have not been clicked and exposed sample service objects that have been clicked, and ratios between the exposed sample service objects that have not been clicked and the exposed sample service objects that have been clicked in the unit service object sets are the same.

The sample unit service object set in the plurality of fields is the to-be-recommended service object set described above.

Step S202: Generate a random field feature of each of the fields, and generating a random object feature of each sample service object in a plurality of sample unit service object sets.

Specifically, the server generates the random field feature of each field, and generate the random object feature of each sample service object in the plurality of sample unit service object sets. Both the random field features and the random object features will participate in model training. The random field features after training are the original field features described above, and the random object features after training are the original object features described above.

Step S203: Invoke a sample cross-field recommendation model to perform cross-field cross-encoding on all the random field features and all the random object features to obtain a predicted interest feature of the sample user in a sample field.

Specifically, the server invokes the sample cross-field recommendation model to perform cross-encoding on all the random field features and all the random object features to obtain a sample general interest feature of the sample user. A process of determining the sample general interest feature is basically the same as the above-mentioned process of determining the general interest feature of the target user, and the details will not be repeated here.

The server determines the sample field in the plurality of fields. The sample field is any of the plurality of fields. The server obtains a random field feature of the sample field, and obtains a random object feature of each sample service object in the sample unit service object set in the sample field. The server invokes the sample cross-field recommendation model to perform cross-encoding on the sample general interest feature, the random field feature of the sample field, and the random object feature of each sample service object in the sample unit service object set in the sample field, to obtain the predicted interest feature of the sample user in the sample field.

A process of determining the predicted interest feature of the sample user in the sample field is basically the same as the above-mentioned process of determining the target field interest feature of the target user in the target field, and the details will not be repeated here.

Step S204: Determine a feature similarity between the predicted interest feature and the random object feature of the sample field, and obtaining a behavior label of the random object feature of the sample field.

Specifically, the server calculates a feature similarity between the predicted interest feature and the random object feature of each sample service object in the sample unit service object set in the sample field. The feature similarity ranges from 0 to 1. The server obtains the behavior label of the random object feature of each sample service object in the sample unit service object set in the sample field. The value of the behavior label may be 1 or 0. The behavior label with a value of 1 indicates that the sample service object corresponding to the behavior label has not only been exposed to the sample user, but has also been clicked by the sample user to view the detailed contents of the sample service object. The behavior label with a value of 0 indicates that the sample service object corresponding to the behavior label has only been exposed to the sample user, and has not been clicked by the sample user.

Step S205: Determine a prediction error according to the behavior label and the feature similarity, and train the sample cross-field recommendation model based on the prediction error to obtain the cross-field recommendation model.

Specifically, the server determines an error of the random object feature of each sample service object in the sample unit service object set in the sample field according to the feature similarity and the behavior label of the random object feature of each sample service object in the sample unit service object set in the sample field, and adds all the errors to obtain the prediction error. Based on the gradient descent principle, the prediction error is back-propagated to the sample cross-field recommendation model, the random field feature of each field, and the random object feature of each sample service object in the plurality of sample unit service object sets, to adjust model parameters of the sample cross-field recommendation model, adjust the random field feature of each field, and adjust the random object feature of each sample service object in the plurality of sample unit service object sets.

So far, one iterative update of the sample cross-field recommendation model has been completed. The server may use the same method to take the fields other than the sample field as the sample field in turn, then update the sample cross-field recommendation model, and use the plurality of sample unit service object sets of other sample users to participate in the training of the sample cross-field recommendation model for continuous iteration and adjustment. There may be multiple sample users participating in the model training, and the sample unit service object set of each sample user contain identical sample service objects.

When the adjusted sample cross-field recommendation model satisfies a model convergence condition, the adjusted sample cross-field recommendation model is used as the cross-field recommendation model, the adjusted random field feature of each of the fields is used as an original field feature, and the adjusted random object feature of each sample service object in the plurality of sample unit service object sets is used as an original object feature.

If the number of adjustments reaches an adjustment threshold, it is considered that the adjusted sample cross-field recommendation model satisfies the model convergence condition. Alternatively, if a difference between the model parameters before the adjustment and the model parameters after the adjustment is less than a preset difference threshold, it is considered that the adjusted sample cross-field recommendation model satisfies the model convergence condition. Alternatively, if prediction accuracy of the adjusted sample cross-field recommendation model reaches a preset accuracy threshold, it is considered that the adjusted sample cross-field recommendation model satisfies the model convergence condition.

Once the model training is complete, a prediction may be made.

Step S206: Obtain a service object set associated with a target user in a plurality of fields in response to a data recommendation request for the target user in a target field. The service object set includes service objects associated with the target user in each field, and the plurality of fields include the target field.

Step S207: Invoke the cross-field recommendation model to encode the plurality of fields and the service object set to obtain a target field interest feature of the target user in the target field.

Step S208: Obtain to-be-recommended service object features of a plurality of to-be-recommended service objects in the target field, obtain a target to-be-recommended service object feature matching with the target field interest feature of the target user from the to-be-recommended service object features, and output a target to-be-recommended service object corresponding to the target to-be-recommended service object feature.

For specific implementation processes of step S206 to step S208, reference may be made to step S101 to step S104 in the embodiment corresponding to FIG. 3.

Figure 7:
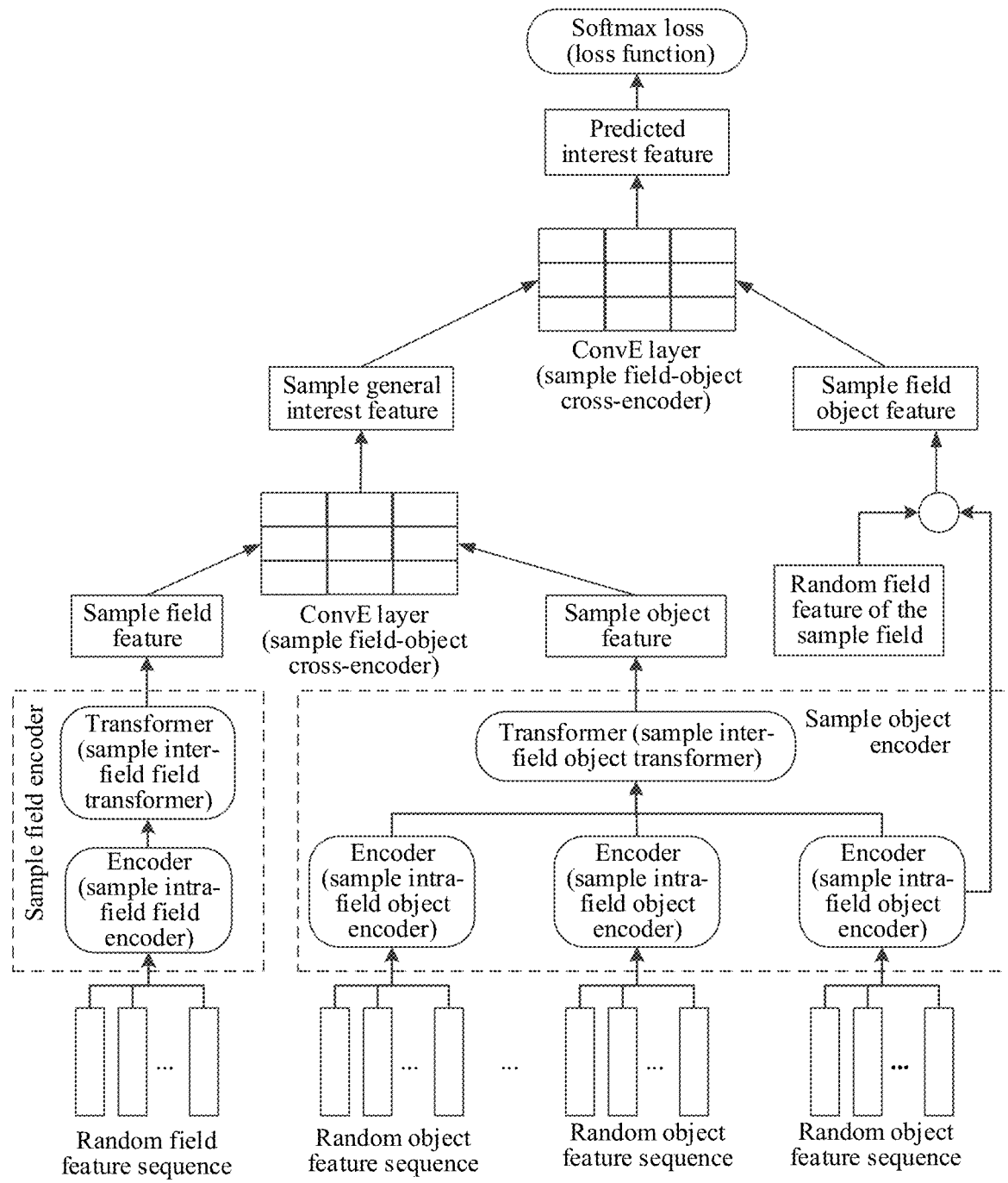
FIG. 7 is a schematic diagram of a sample cross-field recommendation model according to an embodiment of this application.

FIG. 7 is a schematic diagram of a sample cross-field recommendation model according to an embodiment of this application. As shown in FIG. 7, random field features of a plurality of fields are obtained, and a plurality of random field features are combined into a random field feature sequence and inputted into Encoder (or referred to as sample intra-field field encoder) and Transformer (or referred to as sample inter-field field transformer). The Encoder and the Transformer encode the random field feature sequence into sample field features. A plurality of random object features of the sample unit service object set associated with the sample user in each field are obtained, and the plurality of random object features in each field are combined into a random object feature sequence. A plurality of random object feature sequences are inputted into Encoder (or referred to as sample intra-field object encoder) and Transformer (or referred to as sample inter-field object transformer). The Encoder and the Transformer encode the plurality of random object feature sequences into samples object features. The sample field features and the sample object features are inputted into a ConvE layer (or referred to as sample field-object cross-encoder), and the ConvE layer cross-encodes the sample field features and the sample object features into sample general interest features. A calculation formula of the ConvE layer is the above-mentioned formula (4). One field is randomly selected from the plurality of fields as the sample field. A random field feature of the sample field is obtained. A sample unit service object set in the sample field is obtained. An encoding vector obtained by the Encoder by encoding the random object feature sequence of the sample unit service object set in the sample field is obtained. The encoding vector and the random field feature of the sample field are spliced into a sample field object feature. The sample field object feature and the sample general interest features are inputted into the ConvE layer. The ConvE layer cross-encodes the sample field object feature and the sample general interest features into a predicted interest feature; calculates a feature similarity between the predicted interest feature and each of a plurality of random object features of sample unit service object set in the sample field; measures a prediction error based on a Softmax loss function between the feature similarities and behavior labels of the plurality of random object features of the sample unit service object set in the sample field; and adjusts the sample intra-field field encoder, the sample inter-field field transformer, the sample intra-field object encoder, the sample inter-field object transformer, and the sample field-object cross-encoder in the sample cross-field recommendation model according to the prediction error, adjusts the random field feature sequence, and adjusts the plurality of random object feature sequences. Multiple adjustments are performed until the adjusted sample cross-field recommendation model satisfies the model convergence condition.

As can be seen from the above, this application proposes the definition of knowledge graph triplet, which can be used for modeling of data structures in multiple product fields, thereby achieving a unified the data form, and providing a data basis for model training. In this application, the Transformer is used to extract intra-field features to solve the problem of sparse features, and ConvE is used to perform inter-field feature cross-computation to improve the effect of cross-field feature cross-computation, enhancing user behavior derivation capabilities. By introducing the knowledge information of the target field as a field bias to transform the user interest space, the expression ability of the target field interest feature of the user is enhanced. Furthermore, because the interest feature of the user in the target field is determined based on user behaviors in different fields that complement each other, the recommendation of service objects in the target field for the user based on the interest feature in the target field is more targeted, which can further improve the accuracy of data recommendation.

Figure 8:
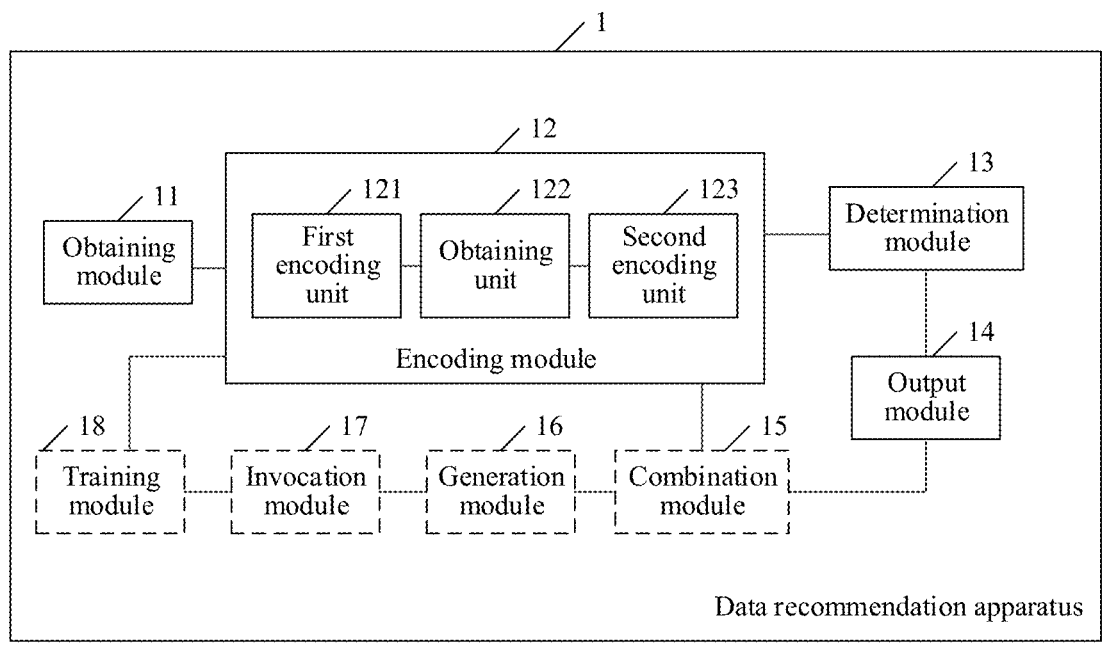
FIG. 8 is a schematic structural diagram of a data recommendation apparatus according to an embodiment of this application.

Further, FIG. 8 is a schematic structural diagram of a data recommendation apparatus according to an embodiment of this application. As shown in FIG. 8, the data recommendation apparatus 1 may be applicable to the servers in the embodiments corresponding to FIG. 3 to FIG. 7. The data recommendation apparatus may be a computer program (including program code) running in a computer device. For example, the data recommendation apparatus is an application software. The apparatus may be configured to execute the corresponding steps in the method provided in the embodiments of this application.

The data recommendation apparatus 1 may include: an obtaining module 11, an encoding module 12, a determination module 13, and an output module 14.

The obtaining module 11 is configured to obtain a service object set associated with a target user in a plurality of fields in response to a data recommendation request for the target user in a target field, the service object set including service objects associated with the target user in each field, and the plurality of fields including the target field.

The encoding module 12 is configured to encode the plurality of fields and the service object set to obtain a target field interest feature of the target user in the target field.

The obtaining module 11 is further configured to obtain to-be-recommended service object features of a plurality of to-be-recommended service objects in the target field.

The determination module 13 is configured to obtain a target to-be-recommended service object feature matching with the target field interest feature of the target user from the to-be-recommended service object features.

The output module 14 is configured to output a target to-be-recommended service object corresponding to the target to-be-recommended service object feature.

In some embodiments, the determination module 13 is further configured to execute the following operations:

determining a feature distance between the target field interest feature and each of the to-be-recommended service object features; and determining the target to-be-recommended service object feature in the plurality of to-be-recommended service object features according to the feature distances.

In some embodiments, the plurality of fields include at least two of: a text field, a video field, a game field, and an embedded application field.

If the target field is the text field, the target to-be-recommended service object includes a target to-be-recommended electronic reading material.

In some embodiments, the obtaining of the service object set associated with the target user in the plurality of fields by the obtaining module 11 further includes:
  obtaining at least one exposed service object that has been exposed to the target user in each of the fields;
  when a quantity of the at least one exposed service object in any of the fields is equal to a quantity threshold, combining the at least one exposed service object in the any field into a unit service object set of the any field;
  when the quantity of the at least one exposed service object in any field is less than the quantity threshold, obtaining at least one non-entity service object, and combining the at least one exposed service object in the any field and the at least one non-entity service object into a unit service object set of the any field; and
  combining the unit service object set of each of the fields into the service object set associated with the target user.

For specific implementations of functions of the obtaining module 11, the encoding module 12, the determination module 13, and the output module 14, reference may be made to step S101 to step S104 in the embodiment corresponding to FIG. 3, and the details will not be repeated here.

Referring to FIG. 8, the encoding module 12 may include: a first encoding unit 121, an obtaining unit 122, and a second encoding unit 123.

The first encoding unit 121 is configured to invoke a cross-field recommendation model to perform cross-encoding on the plurality of fields and the service object set to obtain a general interest feature of the target user.

The obtaining unit 122 is configured to obtain a target service object associated with the target user in the target field.

The second encoding unit 123 is configured to invoke the cross-field recommendation model to perform cross-encoding on the general interest feature, the target field, and the target service object to obtain the target field interest feature.

In some embodiments, the cross-field recommendation model includes a field encoder, an object encoder, and a field-object cross-encoder; and
  the first encoding unit 121 is further configured to execute the following operations:
  obtaining an original field feature of each of the fields, and invoking the field encoder to encode all the original field features into field features;
  obtaining an original object feature of each service object in the service object set, and invoking the object encoder to encode all the original object features into object features; and
  invoking the field-object cross-encoder to cross-encode the field features and the object features into the general interest feature of the target user.

In some embodiments, the field encoder includes an intra-field field encoder and an inter-field field transformer; and
  the invoking of the field encoder to encode all the original field features into the field features by the first encoding unit 121 further includes:
  combining all the original field features into an original field feature sequence;
  invoking the intra-field field encoder to perform self-attention cyclic encoding on the original field feature sequence to obtain a first encoding vector sequence;
  performing pooling on the first encoding vector sequence to obtain a second encoding vector; and
  invoking the inter-field field transformer to perform multi-head attention encoding on the second encoding vector to obtain the field feature.

In some embodiments, the object encoder includes an intra-field object encoder; and
  the second encoding unit 123 is further configured to execute the following operations:
  obtaining a target field feature of the target field;
  invoking the intra-field object encoder to encode the target service object into a target object feature;
  splicing the target field feature and the target object feature into a target field object feature; and
  invoking the field-object cross-encoder to cross-encode the general interest feature and the target field object feature into the target field interest feature.

In some embodiments, a plurality of target service objects exist, and the plurality of target service objects are all non-entity target service objects, or the plurality of target service objects include an entity target service object and a non-entity target service object, and the entity target service object belongs to the plurality of to-be-recommended service objects.

For specific implementations of functions of the first encoding unit 121, the obtaining unit 122, and the second encoding unit 123, reference may be made to step S102 in the embodiment corresponding to FIG. 3, and the details will not be repeated here.

Referring to FIG. 8 again, in addition to the obtaining module 11, the encoding module 12, the determination module 13, and the output module 14, the data recommendation apparatus 1 may further include: a combination module 15, a generation module 16, an invocation module 17, and a training module 18.

The combination module 15 is configured to combine the target user, the target field, and the target to-be-recommended service object into a knowledge graph triplet, and update the cross-field recommendation model based on the knowledge graph triplet.

The generation module 16 is configured to obtain a sample unit service object set associated with a sample user in each of the fields, generate a random field feature of each of the fields, and generate a random object feature of each sample service object in a plurality of sample unit service object sets.

The invocation module 17 is configured to invoke a sample cross-field recommendation model to perform cross-field cross-encoding on all the random field features and all the random object features to obtain a predicted interest feature of the sample user in a sample field, the sample field being any of the plurality of fields.

The generation module 16 is further configured to determine a feature similarity between the predicted interest feature and the random object feature of the sample field, obtain a behavior label of the random object feature of the sample field, and determine a prediction error according to the behavior label and the feature similarity.

The training module 18 is configured to train the sample cross-field recommendation model based on the prediction error to obtain the cross-field recommendation model.

In some embodiments, the obtaining of the sample unit service object set associated with the sample user in each of the fields by the generation module 16 further includes:

obtaining a sample knowledge graph triplet set of the sample user, the sample knowledge graph triplet set including a plurality of sample knowledge graph triplets, and any of the sample knowledge graph triplets includes a user identity of the sample user, a field identifier of any field in the plurality of fields, and an object identifier of the sample service object that has been exposed to the sample user in the any field; and determining the sample unit service object set associated with the sample user in each of the fields in the sample knowledge graph triplet set.

In some embodiments, the training module 18 is further configured to execute the following operations:

adjusting the sample cross-field recommendation model, the random field feature of each of the fields, and the random object feature of each sample service object in the plurality of sample unit service object sets based on the prediction error; and when the adjusted sample cross-field recommendation model satisfies a model convergence condition, using the adjusted sample cross-field recommendation model as the cross-field recommendation model, using the adjusted random field feature of each of the fields as an original field feature, and using the adjusted random object feature of each sample service object in the plurality of sample unit service object sets as an original object feature.

In some embodiments, the invocation module 17 is further configured to execute the following operations:

invoking the sample cross-field recommendation model to perform cross-encoding on all the random field features and all the random object features to obtain a sample general interest feature of the sample user; and determining the sample field in the plurality of fields, and invoking the sample cross-field recommendation model to perform cross-encoding on the sample general interest feature, the random field feature of the sample field, and the random object feature of the sample field to obtain the predicted interest feature.

For a specific implementation of functions of the combination module 15, reference may be made to step S104 in the embodiment corresponding to FIG. 3; for specific implementations of functions of the generation module 16, the invocation module 17, and the training module 18, reference may be made to step S201 to step S205 in the embodiment corresponding to FIG. 6, and the details will not be repeated here.

Figure 9:
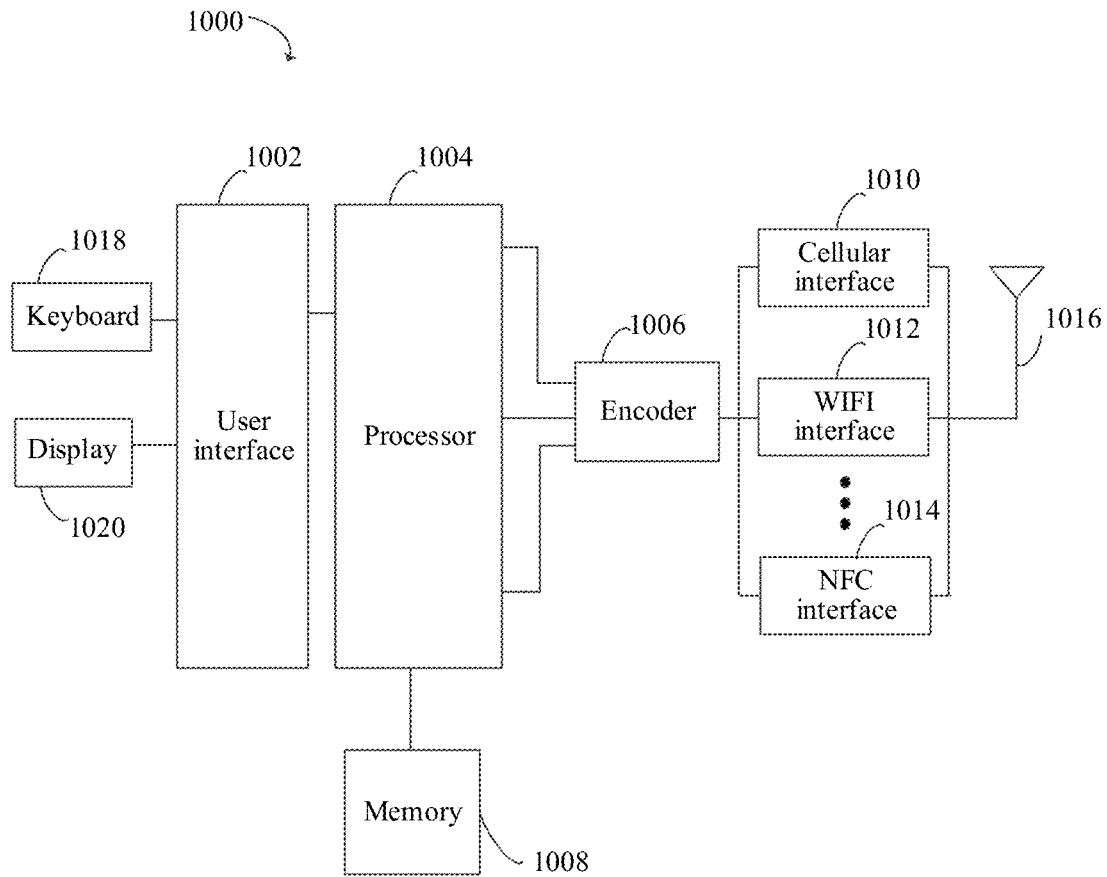
FIG. 9 is a schematic structural diagram of a computer device according to an embodiment of this application.

Further, FIG. 9 is a schematic structural diagram of a computer device according to an embodiment of this application. The terminal device in the embodiments corresponding to FIG. 3 to FIG. 7 may be a computer device 1000. As shown in FIG. 9, the computer device 1000 may include a user interface 1002, a processor 1004, an encoder 1006, and a memory 1008. A signal receiver 1016 is configured to receive or transmit data via a cellular interface 1010, a WIFI interface 1012, . . . , or an NFC interface 1014. The encoder 1006 encodes the received data into a computer-processable data format. A computer program is stored in the memory 1008. The processor 1004 is configured to execute the steps in any one of the above method embodiments by running the computer program. The memory 1008 may include a volatile memory (e.g., dynamic random access memory (DRAM)), and may also include a non-volatile memory (e.g., one-time programmable read-only memory (OTPROM)). In some examples, the memory 1008 may further include memories remotely disposed relative to the processor 1004, and these remote memories may be connected to the computer device 1000 through a network. The user interface 1002 may include a keyboard 1018 and a display 1020.

In the computer device 1000 shown in FIG. 9, the processor 1004 may be configured to invoke the computer program stored in the memory 1008, to implement the following steps:

obtaining a service object set associated with a target user in a plurality of fields in response to a data recommendation request for the target user in a target field, the service object set including service objects associated with the target user in each field, and the plurality of fields including the target field;

encoding the plurality of fields and the service object set to obtain a target field interest feature of the target user in the target field;

obtaining to-be-recommended service object features of a plurality of to-be-recommended service objects in the target field; and obtaining a target to-be-recommended service object feature matching with the target field interest feature of the target user from the to-be-recommended service object features, and outputting a target to-be-recommended service object corresponding to the target to-be-recommended service object feature to the target user.

It is to be understood that the computer device 1000 described in the embodiments of the present invention may execute the description of the data recommendation method in the foregoing embodiments corresponding to FIG. 3 to FIG. 7, and may also execute the description of the data recommending apparatus 1 in the foregoing embodiment corresponding to FIG. 8, and the details will not be repeated here. In addition, the description of beneficial effects of the same method are not described herein again.

In addition, an embodiment of this application further provides a computer storage medium. The computer storage medium stores a computer program executed by the data recommendation apparatus 1 mentioned above, and the computer program includes program instructions. When executing the program instructions, the processor can implement the methods in the embodiments corresponding to FIG. 3 to FIG. 7, which will not be repeated here. In addition, the description of beneficial effects of the same method are not described herein again. For technical details that are not disclosed in the computer storage medium embodiments of this application, refer to the descriptions of the method embodiments of this application. By way of example, the program instructions may be deployed on one computer device, or executed on multiple computer devices located at one location, or executed on multiple computer devices distributed at multiple locations and interconnected by a communication network. The multiple computer devices distributed in the multiple locations and interconnected by the communication network can form a blockchain system.

According to an aspect of this application, a computer program product or a computer program is provided, the computer program product or the computer program including computer instructions, the computer instructions being stored in a computer-readable storage medium. The processor of the computer device reads the computer instructions from the computer-readable storage medium, and the processor executes the computer instructions, to cause the computer device to perform the method in the embodiments corresponding to FIG. 3 to FIG. 7. Therefore, details are not described herein again.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely an example of the embodiments of the present invention, and certainly is not intended to limit the protection scope of the embodiments of the present invention. Therefore, equivalent variations made in accordance with the claims of the present disclosure shall fall within the scope of the present invention. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A data recommendation method performed by a computer device, comprising:
   obtaining a service object set associated with a target user in a plurality of fields in response to a data recommendation request for the target user in a target field, the service object set comprising service objects associated with the target user in each field, and the plurality of fields comprising the target field;
   encoding the plurality of fields and the service object set to obtain a target field interest feature of the target user in the target field, by:
      invoking a cross-field recommendation model to perform cross-encoding on the plurality of fields and the service object set to obtain a general interest feature of the target user,
      obtaining a plurality of target service objects associated with the target user in the target field, and
      invoking the cross-field recommendation model to perform cross-encoding on the general interest feature, the target field, and the plurality of target service objects to obtain the target field interest feature of the target user in the target field;
   obtaining to-be-recommended service object features of a plurality of to-be-recommended service objects in the target field of the user interface;
   obtaining a target to-be-recommended service object feature matching with the target field interest feature of the target user from the to-be-recommended service object features; and
   returning a target to-be-recommended service object corresponding to the target to-be-recommended service object feature to the target user,
   wherein the cross-field recommendation model is trained by:
      obtaining a sample unit service object set associated with a sample user in each of the plurality of fields;
      generating a random field feature of each of the plurality of fields, and generating a random object feature of each sample service object in a plurality of sample unit service object sets;
      invoking a sample cross-field recommendation model to perform cross-field cross-encoding on the random field features and the random object features to obtain a predicted interest feature of the sample user in a sample field, the sample field being any of the plurality of fields;
      determining a feature similarity between the predicted interest feature and the random object feature of the sample field, and obtaining a behavior label of the random object feature of the sample field; and
      determining a prediction error according to the behavior label and the feature similarity, and training the sample cross-field recommendation model based on the prediction error to obtain the cross-field recommendation model.

2. The method according to claim 1, wherein the cross-field recommendation model comprises a field encoder, an object encoder, and a field-object cross-encoder; and
   the invoking a cross-field recommendation model to perform cross-encoding on the plurality of fields and the service object set to obtain a general interest feature of the target user composes:
      obtaining an original field feature of at least one of the fields, and invoking the field encoder to encode the original field features into field features;
      obtaining an original object feature of at least one service object in the service object set, and invoking the object encoder to encode the original object features into object features; and
      invoking the field-object cross-encoder to cross-encode the field features and the object features into the general interest feature of the target user.

3. The method according to claim 2, wherein the field encoder comprises an intra-field field encoder and an inter-field field transformer; and
   the invoking the field encoder to encode all the original field features into field features comprises:
      combining the original field features into an original field feature sequence;
      invoking the intra-field field encoder to perform self-attention cyclic encoding on the original field feature sequence to obtain a first encoding vector sequence;
      performing pooling on the first encoding vector sequence to obtain a second encoding vector; and
      invoking the inter-field field transformer to perform multi-head attention encoding on the second encoding vector to obtain the field feature.

4. The method according to claim 2, wherein the object encoder comprises an intra-field object encoder; and
   the invoking the cross-field recommendation model to perform cross-encoding on the general interest feature, the target field, and the target service object to obtain the target field interest feature comprises:
      obtaining a target field feature of the target field;
      invoking the intra-field object encoder to encode the target service object into a target object feature;
      splicing the target field feature and the target object feature into a target field object feature; and
      invoking the field-object cross-encoder to cross-encode the general interest feature and the target field object feature into the target field interest feature.

5. The method according to claim 1, wherein the plurality of target service objects comprise an entity target service object and a non-entity target service object, and the entity target service object belongs to the plurality of to-be-recommended service objects.

6. The method according to claim 1, wherein the obtaining a sample unit service object set associated with a sample user in each of the fields comprises:
- obtaining a sample knowledge graph triplet set of the sample user, the sample knowledge graph triplet set comprising a plurality of sample knowledge graph triplets, and any of the sample knowledge graph triplets comprises a user identity of the sample user, a field identifier of any field in the plurality of fields, and an object identifier of the sample service object that has been exposed to the sample user in the any field; and
- determining the sample unit service object set associated with the sample user in each of the fields in the sample knowledge graph triplet set.

7. The method according to claim 1, wherein the training the sample cross-field recommendation model based on the prediction error to obtain the cross-field recommendation model comprises:
- adjusting the sample cross-field recommendation model, the random field feature of each of the fields, and the random object feature of each sample service object in the plurality of sample unit service object sets based on the prediction error; and
- when the adjusted sample cross-field recommendation model satisfies a model convergence condition, using the adjusted sample cross-field recommendation model as the cross-field recommendation model, using the adjusted random field feature of each of the fields as an original field feature, and using the adjusted random object feature of each sample service object in the plurality of sample unit service object sets as an original object feature.

8. The method according to claim 1, wherein the invoking a sample cross-field recommendation model to perform cross-field cross-encoding on all the random field features and all the random object features to obtain a predicted interest feature of the sample user in a sample field comprises:
- invoking the sample cross-field recommendation model to perform cross-encoding on all the random field features and all the random object features to obtain a sample general interest feature of the sample user; and
- determining the sample field in the plurality of fields, and invoking the sample cross-field recommendation model to perform cross-encoding on the sample general interest feature, the random field feature of the sample field, and the random object feature of the sample field to obtain the predicted interest feature.

9. The method according to claim 1, wherein the obtaining a service object set associated with a target user in a plurality of fields comprises:
- obtaining at least one exposed service object that has been exposed to the target user in each of the plurality of fields;
- when a quantity of the at least one exposed service object in any of the plurality of fields is at least equal to a quantity threshold, combining the at least one exposed service object in the field into a unit service object set of the field;
- when the quantity of the at least one exposed service object in any field is less than the quantity threshold, obtaining at least one non-entity service object, and combining the at least one exposed service object in the field and the at least one non-entity service object into a unit service object set of the field; and
- combining the unit service object set of each of the fields into the service object set associated with the target user.

10. The method according to claim 1, wherein the obtaining a target to-be-recommended service object feature matching with the target field interest feature of the target user from the to-be-recommended service object features comprises:
- determining a feature distance between the target field interest feature of the target user and each of the to-be-recommended service object features; and
- determining the target to-be-recommended service object feature in the to-be-recommended service object features with a minimum feature distance to the target field interest feature of the target user.

11. A computer device, comprising a memory and a processor, the memory storing a computer program that, when executed by the processor, causing the computer device to perform a data recommendation method including:
- obtaining a service object set associated with a target user in a plurality of fields in response to a data recommendation request for the target user in a target field, the service object set comprising service objects associated with the target user in each field, and the plurality of fields of the user interface comprising the target field;
- encoding the plurality of fields and the service object set to obtain a target field interest feature of the target user in the target field, by:
  - invoking a cross-field recommendation model to perform cross-encoding on the plurality of fields and the service object set to obtain a general interest feature of the target user,
  - obtaining a plurality of target service objects associated with the target user in the target field, and
  - invoking the cross-field recommendation model to perform cross-encoding on the general interest feature, the target field, and the plurality of target service objects to obtain the target field interest feature of the target user in the target field;
- obtaining to-be-recommended service object features of a plurality of to-be-recommended service objects in the target field;
- obtaining a target to-be-recommended service object feature matching with the target field interest feature of the target user from the to-be-recommended service object features; and
- returning a target to-be-recommended service object corresponding to the target to-be-recommended service object feature to the target user,
- wherein the cross-field recommendation model is trained by:
  - obtaining a sample unit service object set associated with a sample user in each of the plurality of fields;
  - generating a random field feature of each of the plurality of fields, and generating a random object feature of each sample service object in a plurality of sample unit service object sets;
  - invoking a sample cross-field recommendation model to perform cross-field cross-encoding on the random field features and the random object features to obtain a predicted interest feature of the sample user in a sample field, the sample field being any of the plurality of fields;
  - determining a feature similarity between the predicted interest feature and the random object feature of the sample field, and obtaining a behavior label of the random object feature of the sample field; and determining a prediction error according to the behavior label and the feature similarity, and training the sample cross-field recommendation model based on the prediction error to obtain the cross-field recommendation model.

12. The computer device according to claim 11, wherein the plurality of target service objects comprise an entity target service object and a non-entity target service object, and the entity target service object belongs to the plurality of to-be recommended service objects.

13. The computer device according to claim 11, wherein the obtaining a service object set associated with a target user in a plurality of fields comprises:
    obtaining at least one exposed service object that has been exposed to the target user in each of the plurality of fields;
    when a quantity of the at least one exposed service object in any of the plurality of fields is at least equal to a quantity threshold, combining the at least one exposed service object in the field into a unit service object set of the field;
    when the quantity of the at least one exposed service object in any field is less than the quantity threshold, obtaining at least one non-entity service object, and combining the at least one exposed service object in the field and the at least one non-entity service object into a unit service object set of the field; and
    combining the unit service object set of each of the fields into the service object set associated with the target user.

14. The computer device according to claim 11, wherein the obtaining a target to-be-recommended service object feature matching with the target field interest feature of the target user from the to-be-recommended service object features comprises:
    determining a feature distance between the target field interest feature of the target user and each of the to-be-recommended service object features; and
    determining the target to-be-recommended service object feature in the to-be-recommended service object features with a minimum feature distance to the target field interest feature of the target user.

15. A non-transitory computer-readable storage medium, storing a computer program that, when executed by a processor of a computer device, causing the computer device to perform a data recommendation method including:
    obtaining a service object set associated with a target user in a plurality of fields in response to a data recommendation request for the target user in a target field, the service object set comprising service objects associated with the target user in each field, and the plurality of fields comprising the target field;
    encoding the plurality of fields and the service object set to obtain a target field interest feature of the target user in the target field, by:
        invoking a cross-field recommendation model to perform cross-encoding on the plurality of fields and the service object set to obtain a general interest feature of the target user,
        obtaining a plurality of target service objects associated with the target user in the target field, and
        invoking the cross-field recommendation model to perform cross-encoding on the general interest feature, the target field, and the plurality of target service objects to obtain the target field interest feature of the target user in the target field;
    obtaining to-be-recommended service object features of a plurality of to-be-recommended service objects in the target field;
    obtaining a target to-be-recommended service object feature matching with the target field interest feature of the target user from the to-be-recommended service object features; and
    returning a target to-be-recommended service object corresponding to the target to-be-recommended service object feature to the target user,
    wherein the cross-field recommendation model is trained by:
        obtaining a sample unit service object set associated with a sample user in each of the plurality of fields;
        generating a random field feature of each of the plurality of fields, and generating a random object feature of each sample service object in a plurality of sample unit service object sets;
        invoking a sample cross-field recommendation model to perform cross-field cross-encoding on the random field features and the random object features to obtain a predicted interest feature of the sample user in a sample field, the sample field being any of the plurality of fields;
        determining a feature similarity between the predicted interest feature and the random object feature of the sample field, and obtaining a behavior label of the random object feature of the sample field; and
        determining a prediction error according to the behavior label and the feature similarity, and training the sample cross-field recommendation model based on the prediction error to obtain the cross-field recommendation model.

16. The non-transitory computer-readable storage medium according to claim 15, wherein the plurality of target service objects comprise an entity target service object and a non-entity target service object, and the entity target service object belongs to the plurality of to-be recommended service objects.

* * * * *